United States Patent
Kang et al.

(10) Patent No.: US 7,425,074 B2
(45) Date of Patent: Sep. 16, 2008

(54) DISPLAY DEVICE AND DISPLAY METHOD

(75) Inventors: Ho Joong Kang, Oeijungboo-si (KR); Hee Jong Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 222 days.

(21) Appl. No.: 11/007,223

(22) Filed: Dec. 9, 2004

(65) Prior Publication Data
US 2005/0152033 A1    Jul. 14, 2005

(30) Foreign Application Priority Data
Dec. 11, 2003    (KR) .................. 10-2003-0089943

(51) Int. Cl.
*G03B 21/14*    (2006.01)
(52) U.S. Cl. .................. 353/46; 353/30; 353/121; 359/209; 359/639
(58) Field of Classification Search .......... 353/69, 353/100, 30, 101, 31, 99, 22, 24, 46, 48, 353/121, 122; 359/209, 211, 639, 640
See application file for complete search history.

(56) References Cited

U.S. PATENT DOCUMENTS

| | | | | |
|---|---|---|---|---|
| 5,402,184 | A * | 3/1995 | O'Grady et al. ............. 348/764 |
| 5,626,411 | A * | 5/1997 | Takahashi et al. ............. 353/94 |
| 5,784,038 | A * | 7/1998 | Irwin ........................ 345/88 |
| 6,574,032 | B1 * | 6/2003 | Roddy et al. ................ 359/290 |
| 6,717,636 | B2 * | 4/2004 | Shimada ..................... 349/77 |
| 6,866,404 | B2 * | 3/2005 | Yamauchi et al. ............ 362/299 |
| 6,971,748 | B2 * | 12/2005 | Cho et al. .................... 353/46 |
| 7,046,407 | B2 * | 5/2006 | Conner ....................... 359/15 |
| 7,050,074 | B1 * | 5/2006 | Koyama ..................... 345/690 |
| 7,052,142 | B2 * | 5/2006 | Gupta ......................... 353/46 |
| 7,086,736 | B2 * | 8/2006 | Collins et al. ................ 353/30 |
| 7,113,231 | B2 * | 9/2006 | Conner et al. ................. 349/5 |
| 7,270,417 | B2 * | 9/2007 | Choi et al. ................... 353/34 |
| 2002/0003636 | A1 | 1/2002 | Conner |
| 2003/0011751 | A1 * | 1/2003 | Sakata et al. ................. 353/30 |
| 2004/0212895 | A1 * | 10/2004 | Pate ........................... 359/634 |
| 2005/0134805 | A1 * | 6/2005 | Conner et al. ................. 353/46 |
| 2005/0140934 | A1 * | 6/2005 | Seo et al. ..................... 353/46 |
| 2005/0157272 | A1 * | 7/2005 | Childers ...................... 353/84 |
| 2005/0162617 | A1 * | 7/2005 | Koo ............................ 353/46 |
| 2005/0185139 | A1 * | 8/2005 | Yamanaka et al. ........... 353/20 |
| 2006/0033887 | A1 * | 2/2006 | Wang .......................... 353/46 |
| 2006/0082560 | A1 * | 4/2006 | Greer et al. ................. 345/204 |

* cited by examiner

*Primary Examiner*—William C. Dowling
(74) *Attorney, Agent, or Firm*—Birch, Stewart, Kolasch & Birch, LLP (57) ABSTRACT

A concept of improving a resolution by using human's visual characteristics is provided. A display device includes an image forming unit forming an image by using an emitted light and an inputted image signal, a projection unit projecting the image formed by the image forming unit onto a screen, and a movable displacement plate displacing the image displayed on the screen. As a result, a viewer can view the image at an improved resolution.

55 Claims, 6 Drawing Sheets

Image signal of
one frame
(T=0~T1)

Odd Data
(T=0)

Fig.5(c)

Even Data
(T=T1)

Image signal of one frame
(T=0~T1)

Odd Data Image

Fig.7(b)

Even Data Image

DISPLAY DEVICE AND DISPLAY METHOD

This application claims the priority benefit of Patent Application No. 10-2003-0089943 filed on Dec. 11, 2003 in Republic of Korea, which is hereby incorporated by reference.

BACKGROUND OF THE INVENTION

1. Field of the Invention

The present invention relates to a display device and a display method, and more particularly, to a display device and method capable of effectively improving resolution of a projection-type display device.

2. Description of the Related Art

Recently, display devices tend to be lightweight, slim and large-sized. Specifically, large-screen display devices have become important in the display fields.

With the advent of digital broadcasting, a projection-type display device requires a high resolution.

SUMMARY OF THE INVENTION

Accordingly, the present invention is directed to a display device and a display method that substantially obviate one or more of the problems due to limitations and disadvantages of the related art.

An object of the present invention is to provide a display device and a display method, which are capable of effectively improving a resolution through a simplified structure and manipulation.

To achieve these and other advantages and in accordance with the purpose of the present invention, as embodied and broadly described, there is provided a display device comprising an image forming unit forming an image by using an emitted light and an inputted image signal, a projection unit projecting the image formed by the image forming unit onto a screen, and a moveable displacement plate displacing the image displayed on the screen.

According to an aspect of the present invention, there is provided a display device comprising an image forming unit forming an image by using an emitted light and an inputted image signal, a projection unit projecting the image formed by the image forming unit onto a screen, and an optical path changing unit disposed on an optical path through which the image is projected, and changing the optical path.

According to an aspect of the present invention, there is provided a display device comprising a lamp emitting a light, a liquid crystal device forming an image by using the light emitted from the lamp and an inputted image signal, a projection unit enlarging and projecting an image from the liquid crystal device onto a screen, and an image displacement unit disposed between the liquid crystal device and the projection unit, and displacing image displayed onto the screen.

According to an aspect of the present invention, there is provided a display device comprising a light source emitting a light, a rod lens making a uniform distribution of the light emitted from the light source, a color wheel performing a color separation with respect to the light emitted from the rod lens, a digital micromirror device (DMD) selectively changing reflection angles of red, green and blue lights emitted from the color wheel depending on an image signal, a projection unit enlarging and projecting an image from the DMD onto a screen, and an image displacement unit disposed between the DMD and the projection unit and displacing the image displayed on the screen.

According to an aspect of the present invention, there is provided a display method comprising the steps of emitting a light, forming an image by using a liquid crystal device to which the emitted light and an image signal are inputted, periodically changing a traveling path of the image, and projecting the image onto a screen.

According to an aspect of the present invention, there is provided a display method comprising the steps of emitting a light, color-separating the emitted light into red, green and blue lights, reflecting the red, green and blue lights at a digital micromirror device (DMD), periodically changing a traveling path of the lights reflected from the DMD, and projecting the lights with the periodically changed traveling path on a screen.

According to an aspect of the present invention, there is provided a display method comprising the steps of emitting a light, forming an image by using the emitted light and an inputted image signal, moving a displacement plate disposed on a traveling path of the image, and projecting the image passing through the displacement plate onto a screen.

According to an aspect of the present invention, there is provided a display method comprising the steps of emitting a light, forming an image by using the emitted light and an inputted image signal, refracting the image by using a light transmitting element disposed on a traveling path of the image, and projecting the image passing through the light transmitting element onto a screen.

According to an aspect of the present invention, there is provided a display device comprising a light source emitting a light, a signal processing unit separating one image signal corresponding to one frame into a plurality of image signals, an image forming unit sequentially forming images by using the plurality of image signals and the emitted light, a projection unit projecting the images formed by the image forming unit onto a screen, and a displacement plate disposed between the image forming unit and the screen and configured to periodically move so as to displace positions of the images displayed on the screen.

According to an aspect of the present invention there is provided a display device comprising a light source emitting a light, a signal processing unit separating one image signal corresponding to one frame into a plurality of image signals, an image forming unit sequentially forming images by using the emitted light and the plurality of image signals, a projection unit projecting the images formed by the image forming unit onto a screen, and a light transmitting element disposed on an optical path between the image forming unit and the screen and configured to periodically move so as to displace the images displayed on the screen toward a plurality of different positions on the screen by using light refraction.

According to an aspect of the present invention, there is provided a display method comprising the steps of inputting image signals having a plurality of frames, separating a sequentially inputted image signal of one frame into a plurality of image signals, sequentially inputting the plurality of separated image signals to form an image, and projecting the image at a plurality of different positions on a screen.

According to the present invention, different images are periodically displayed on a screen such that a viewer feels as if the display device has a large number of pixels. Therefore, resolution can be improved using the same number of the pixels.

Accordingly, the present invention can effectively improve the resolution of a large-screen display device at a low cost.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Hereinafter, a display device and a display method according to the present invention will be described in detail with reference to the accompanying drawings.

A resolution is the number of pixels per square inch on a display device. That is, the resolution is used as a scale representing precision in displaying an image.

In order to improve the resolution, a conventional display device uses a physical method of increasing the number of pixels. However, the present invention improves the resolution by using human's visual characteristics.

According to the present invention, an image can be viewed at a more improved resolution compared with an actual physical resolution, thereby obtaining the same effect that the resolution is physically improved.

Although described below in detail, an image signal corresponding to one frame is separated into a first image signal and a second image signal. The first image signal and the second signal are respectively displayed as a first image and a second image respectively at a first position and a second position of a screen in sequence, such that a viewer feels as if the resolution is improved due to the viewer's visual characteristics.

For example, the first position and the second position on the screen may have a gap below or above a size of one pixel and may be spaced apart in a vertical, horizontal or diagonal direction.

Specifically, according to the present invention, an optical path changing unit is used to make the first image and the second image to be displayed respectively at the first position and the second position of the screen. The optical path changing unit uses a light transmitting element and the optical path is changed depending on the displacement position and displacement angle of the light transmitting element.

Figure 1:
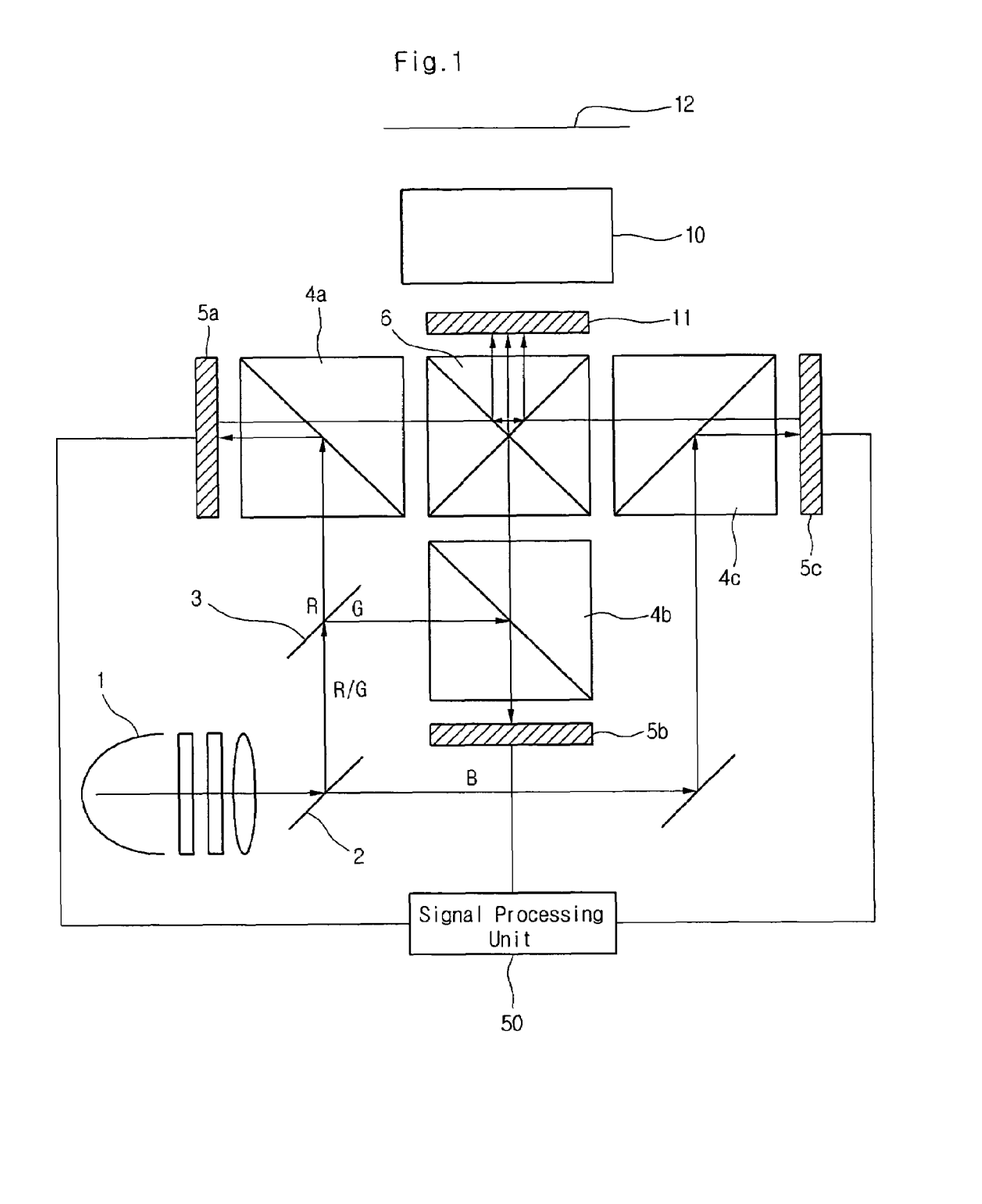
FIG. 1 is a view illustrating a display device and a display method according to an embodiment of the present invention.

FIG. 1 is a view illustrating a display device and a display method according to an embodiment of the present invention.

In FIG. 1, there is shown an illuminating system of a projection TV using a reflection-type LCD. In the reflection-type illuminating system of a 3 PBS (polarized beam splitter) system shown in FIG. 1, light irradiated from a lamp 1 passes through a condensing lens and is incident on a first dichroic mirror 2. The first dichroic mirror 2 reflects red and green lights R and G and transmits a blue light B as shown.

Then, the reflected red and green lights R and G are incident to a second dichroic mirror 3. The second dichroic mirror 3 transmits the red light R to a first PBS 4a and reflects the green light G onto a second PBS 4b. The blue light B from the first dichroic mirror 2 impinges on a third PBS 4C, e.g., through a reflecting mirror. As a result, red, green and blue lights R, G and B are respectively incident on the first, second and third PBSs 4a, 4b and 4c, which are disposed respectively in front of first, second and third LCD panels 5a, 5b and 5c.

The red, green and blue lights R, G and B incident on the first, second and third PBSs 4a, 4b and 4c are reflected and then incident on the first, second and third LCD panels 5a, 5b and 5c, respectively. Phases of the red, green and blue lights R, G and B are changed respectively by the first, second and third LCD panels 5a, 5b and 5c. Then, the red, green and blue lights R, G and B having the changed phases are reflected from the LCD panels 5a, 5b and 5c and transmitted respectively through the first, second and third PBSs 4a, 4b and 4c.

Images are displayed on the first, second and third LCD panels 5a, 5b and 5c, depending on image signals inputted from a signal processing unit 50.

The red, green and blue images, transmitted from the first, second and third LCD panels 5a, 5b and 5c and then through the first, second and third PBSs 4a, 4b and 4c, are combined by an X-prism 6. Then, the combined images pass through a displacement plate 11 and are incident on a projection lens 10. The images passing through the projection lens 10 are projected onto a screen 12. All the components of the illuminating system in FIG. 1 are operatively coupled.

At this point, the displacement plate 11 may be disposed between the X-prism 6 and the projection lens 10, or between the projection lens 10 and the screen 12.

The displacement plate 11 is a thin-plate shaped element that can transmit light and is movable during the operation of the display device. For example, the position and/or angle of the displacement plate 11 can be moved periodically using known mechanical means. A higher resolution can be implemented by changing the position or angle of the displacement plate 11.

In addition, although the illuminating system using the reflection-type LCD, the dichroic mirror and the PBSs is shown in FIG. 1, a transmission-type LCD instead of the reflection-type LCD can also be used. A liquid crystal on silicon (LCoS) can also be used as the reflection-type LCD.

Further, although three LCD panels are shown in FIG. 1, only one LCD panel can be used and a structure of the optical system can be variously modified.

Furthermore, the present invention can be applied to a projector as well as a projection TV.

That is, the present invention may be embodied in many different forms and should not be construed as being limited to the embodiment(s) set forth herein.

Figure 2:
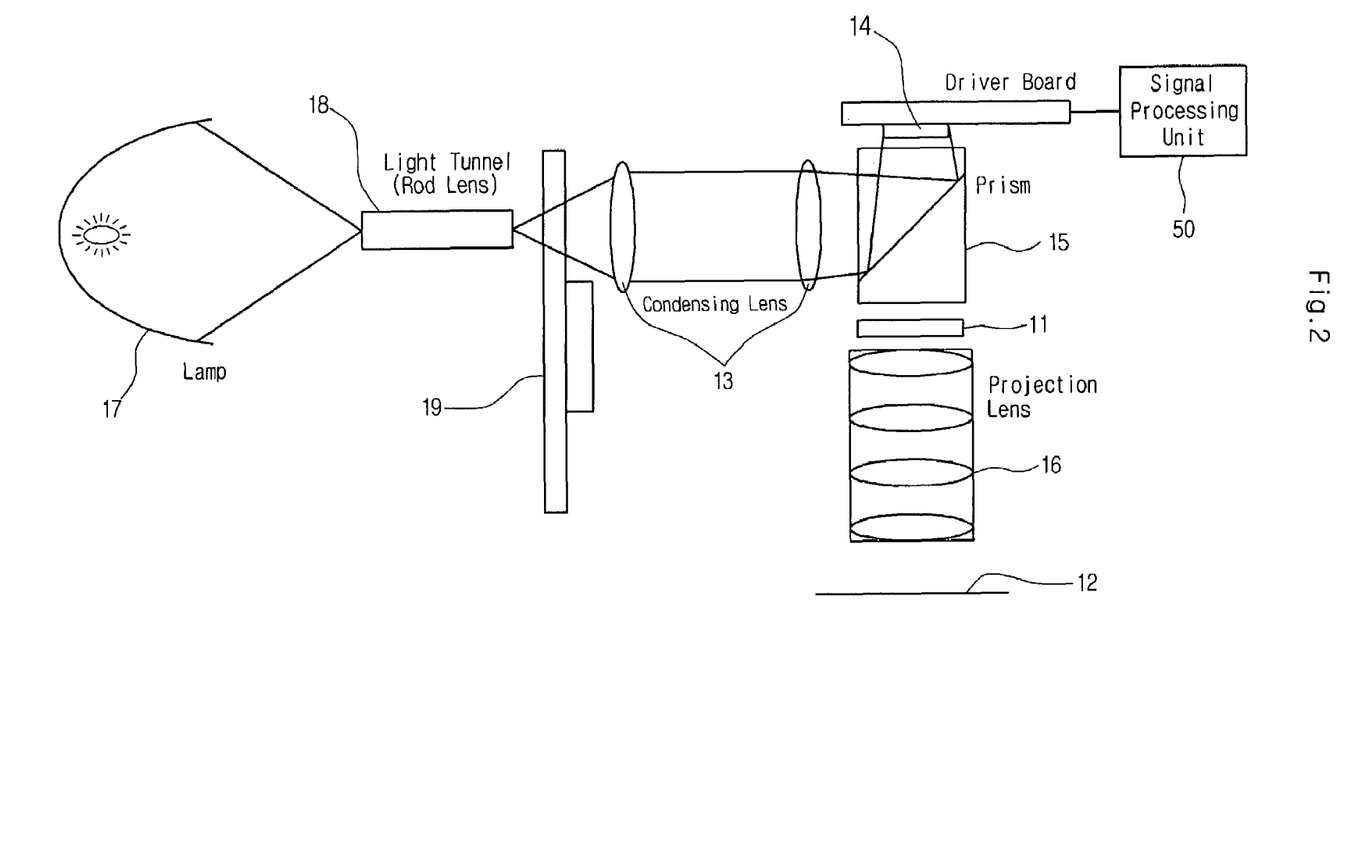
FIG. 2 is a view illustrating a display device and a display method according to another embodiment of the present invention.

FIG. 2 is a view illustrating a display device and a display method according to another embodiment of the present invention. More specifically, a DLP (digital light processing)

optical system according to the present invention will be described below in detail with reference to FIG. 2.

The DLP optical system provides light to be irradiated to a DMD (digital micromirror device) 14 and determines whether to allow respective micromirrors in the DMD 14 to irradiate the light to a screen in an on-state or to irradiate the light to a non-screen in an off-state, depending on image signals, e.g., from a signal processing unit 50.

As shown in FIG. 2, the DLP optical system includes a lamp 17, a rod lens 18, a color wheel 19, a condensing lens 13, a prism 15, the DMD 14, a displacement plate 11, and a projection lens 16. All the components of the system are operatively coupled.

The lamp 17 generates light and the rod lens 18 transmits the light generated from the lamp 17. The color wheel 19 separates a white light passing through the rod lens 18 into red, green and blue lights. The condensing lens 13 condenses the lights passing through the color wheel 19 and the prism 15 reflects the condensed lights onto the DMD 14. The DMD 14 irradiates the impinging lights to the displacement plate 11 through the prism 15. The displacement plate 11 displaces the light reflected from the DMD 14, depending on time. As in FIG. 1, the displacement plate 11 here is moved periodically or as desired using known mechanical means. The projection lens 16 magnifies the lights passing through the displacement plate 11 and projects the magnified lights onto a screen 12.

Based on such a structure, an operation of the DLP optical system will be described below. A white light emitted from the lamp 17 is focused by an inner curvature of a reflector and the focused light passes through a light tunnel or rod lens 18.

The rod lens 18 is provided by attaching four small and elongated mirrors to one another. The light passing through the rod lens 18 is scattered and reflected such that brightness is uniformly distributed.

The brightness of light that will be finally projected onto the screen 12 needs to be uniform. The rod lens 18 performs this function so that it is an important optical element in a projection-type display device.

The light passing through the rod lens 18 is then transmitted through the color wheel 19 for the color separation. The color wheel 19 rotates according to a vertical synchronization of the image.

Then, the light passes through the condensing lens 13 and is reflected by the prism 15, so that the light is directed to the DMD 14. The prism 15 can totally reflect or transmit the light, depending on an incident angle of the light.

The light incident on the DMD 14 is redirected towards the screen 12, depending on the on/off state of the micromirrors (of the DMD 14) controlled in response to sampled pixel values. The DMD 14 changes into the on- or off-state depending on the image signals inputted from the signal processing unit 50. In this manner, a predetermined image is formed.

The image reflected from the DMD 14 and directed to the screen 12 passes through the displacement plate 11 and the projection lens 16. In this course, the image is enlarged and projected onto the large screen 12.

The displacement plate 11 may be disposed between the prism 15 and the projection lens 16 as shown, or between the screen 12 and the projection lens 16. Also, the displacement plate 11 may be disposed between the DMD 14 and the prism 15.

The light is projected onto different locations on the screen 12 depending on the periodical change in the position and/or angle of the displacement plate 11.

According to the embodiments of FIGS. 1 and 2, the displacement plate 11 may be disposed at a predetermined position between the screen and the image forming unit for forming the image through the R, G and B combination. Depending on how and/or where the displacement plate 11 is positioned, the light can be projected at different locations on the screen 12.

Meanwhile, in the image forming unit shown in FIGS. 1 and 2, the image signal corresponding to one frame is separated into the first image signal and the second image signal by the signal processing unit 50. Then, the first image signal and the second image signal are transformed as the first image and the second image by the R, G and B combination, respectively.

In FIG. 1, the image forming unit may be provided with the first, second and third LCD panels 5a, 5b and 5c, the first, second and third PBSs 4a, 4b and 4c and the X-prism 6.

In FIG. 2, the image forming unit may be provided with the color wheel 19, the condensing lens 13 and the DMD 14.

That is, the image signal corresponding to one frame is separated into a plurality of image signals and processed into a plurality of images and then displayed. The image signal corresponding to one frame may be separated into "n" image signals and processed into "n" images and then displayed at "n" or less different positions on the screen.

According to the present invention, a display time of one image is equal to a time given by dividing a display time of one frame image by the number of images.

However, the present invention can make the viewer feel as if the resolution is improved by separating the image signal corresponding to one frame into the first image signal and the second image signal, processing the first image signal and the second image signal into the first image and the second image and then sequentially displaying the first image and the second image at the different positions of the screen.

Figure 3A:
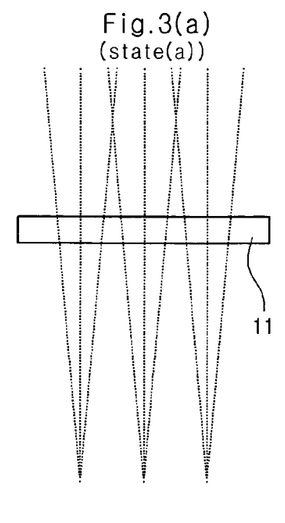
FIGS. 3(a)-3(c) are views illustrating examples of an operation of a displacement plate in the display device of FIGS. 1 and 2 according to the present invention.
Figure 3B:
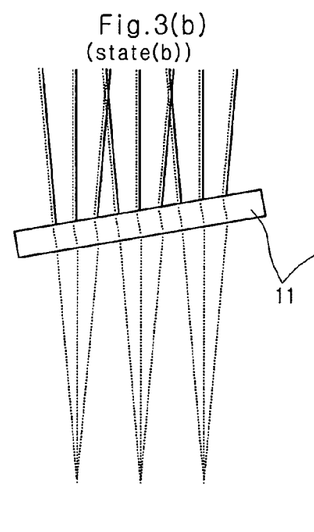
Figure 3C:
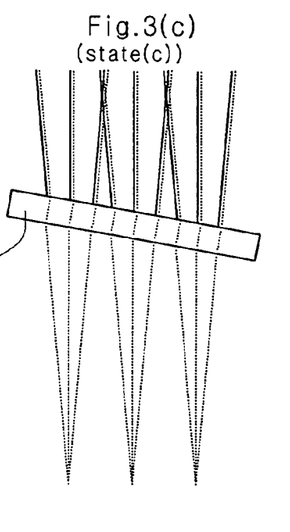

FIGS. 3(a)-3(c) are examples of views illustrating an operation of the displacement plate in the display device (e.g., shown in FIG. 1 or 2) according to the present invention. Particularly, FIG. 3(a) shows a case that there is no displacement plate 11 or there is no motion/angle of the displacement plate 11. In this case, the image projected from the prism or the projection lens is displayed at the same position of the screen. FIG. 3(b) shows a case that the displacement plate 11 is rotated in a counterclockwise direction, and FIG. 3(c) shows a case that the displacement plate 11 is rotated in a clockwise direction.

If the displacement plate 11 changes from the state (a) to the state (b) or (c), the image is refracted while passing through the displacement plate 11, such that the image is displayed at a different location on the screen. That is, since the displacement plate 11 functions as an optical path changing unit, the projected image is displaced due to the displacement plate 11 and is thus displayed onto a different position of the screen depending on the motion/angle of the displacement plate 11. A displacement distance of the image displayed on the screen may be less than a size of one pixel.

Thus, the displacement plate 11 according to the present invention acts as an image displacement unit to make the image to be displayed onto different positions of the screen.

Figure 4:
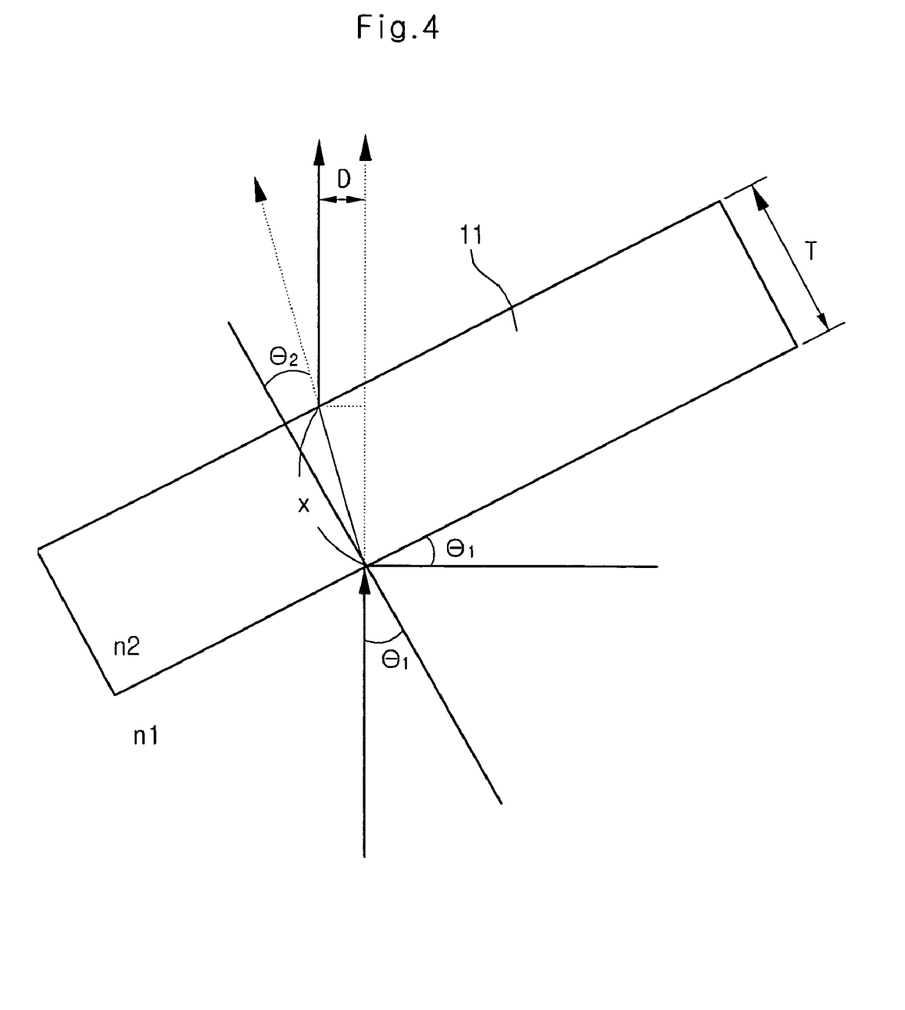
FIG. 4 is a view illustrating an operation principle of the displacement plate acting as an image displacement unit in the display device according to the present invention.

FIG. 4 is an example of a view illustrating an operation principle of the displacement plate acting as an image displacement unit in the display device according to the present invention.

A motion degree of the light on the screen 12 can be calculated depending on the displacement plate's thickness T, tilt angle $\theta_1$ (light incident angle) and refractive index $n_2$. The displacement plate's thickness, tilt angle and refractive index can be determined depending on the required motion degree of the light on the screen 12.

The displacement plate's thickness, tilt angle and refractive index can be derived from Snell's law given by Equation 1 as below.

$$n_1 \sin\theta_1 = n_2 \sin\theta_2 \quad \text{[Equation 1]}$$

where, $n_1$ is the refractive index of air;
$n_2$ is the refractive index of the displacement plate;
$\theta_1$ is the incident angle of light; and
$\theta_2$ is the refraction angle of light.

Thus, the optical path difference D between the lights passing through the displacement plate 11 can be given by Equation 2 as below.

$$D = \frac{T}{\cos\theta_2}\sin(\theta_1 - \theta_2) \quad \text{[Equation 2]}$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where T is the thickness of the displacement plate;
$n_1$ is the refractive index of air;
$n_2$ is the refractive index of the displacement plate;
$\theta_1$ is the incident angle of light;
$\theta_2$ is the refraction angle of light; and
$\chi$ is the length of the optical path of the refracted light within the displacement plate.

In addition, the optical path difference D between the lights passing through the displacement plate 11 determines the displacement of the lights actually displayed onto the screen 12, depending on magnification of the projection lens.

It is preferable that the refractive index ($n_2$) of the displacement plate 11 falls within the range from 1.4 to 2.0. But the invention covers other ranges.

In the examples of FIGS. 1 and 2, the present invention uses the light transmitting element and the light refraction (e.g., the displacement plate 11) to make the optical path difference D.

Meanwhile, a reflection mirror may be used to change the optical path. That is, if the reflection angle of the light is changed, the optical path of the reflected light can be changed depending on the angle of the reflection mirror as disposed on the optical path.

According to the method of changing the optical path using the reflection, the change in the optical path is sensitive to the change in the angle of the reflection mirror, compared with the method of changing the optical path using the light refraction. Therefore, a precise control is required if the reflection is used to change the optical path.

According to the present invention, the displacement degree of the image may be more than or less than a size of one pixel. However, since the displacement degree of the image is small, the optical path changing unit must be precisely controlled so that the image projected from the projection lens can be displaced within a small range.

Therefore, the optical path changing unit using the light transmitting element (e.g., the displacement plate 11) has advantages in that it can be easily manufactured and the error probability is greatly reduced.

Specifically, as shown in FIG. 4, if the light is incident onto the same position of the light transmitting element such as the displacement plate 11, the optical path difference D occurs but the traveling direction of the list does not change.

On the other hand, in the case of using the reflection mirror to change the light path, even if the light is incident onto the same position of the reflection mirror, the traveling direction of the light is changed depending on the angle of the reflection mirror, such that a more precise control over the positioning of the reflection mirror and any of the factors is required.

FIGS. 5(a)-6(b) are views illustrating the displacement of lights projected onto the screen depending on the motion of the displacement plate in the display device (e.g., shown in FIG. 1 or 2) according to the present invention. In these figures, T and T1 represent time.

Figure 5A:
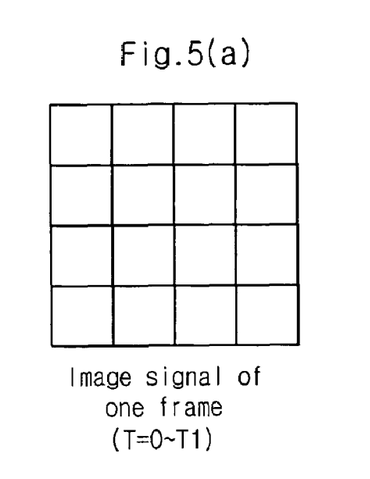
FIGS. 5(a)-5(c) and 6(a)-6(b) are views illustrating different examples of a displacement of light projected onto a screen depending on the motion of a displacement plate in the display device according to the present invention.
Figure 5B:
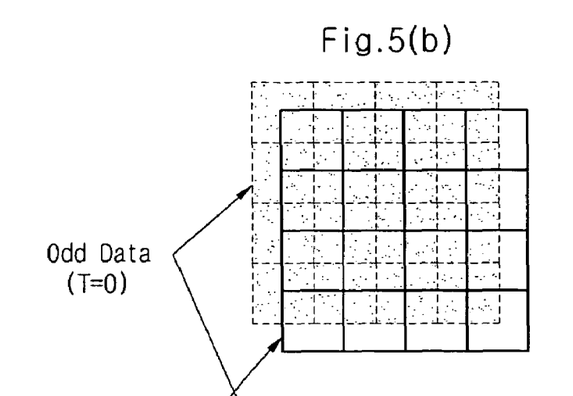
Figure 5C:
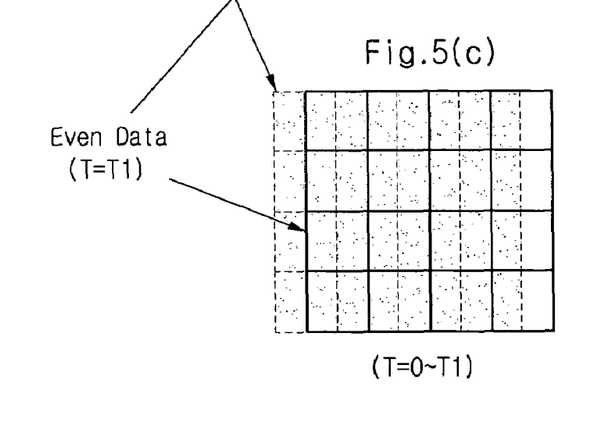

Referring to FIGS. 5(a)-5(c), in the display device having a rectangular pixel structure, the displacement plate 11 periodically moves and thus the positioning of the image on the screen 12 moves.

Referring to FIG. 5(a), conventionally an image is displayed at the same corresponding positions of the screen during a predetermined time (T=0–T1). However, referring to FIGS. 5(b) and 5(c), according to the present invention, different images are displayed at different positions on the screen at time T=0 and at time T=T1. Thus, a double resolution can be recognized using the same number of pixels.

For example, the image signal of one frame is separated into the first and second image signals as discussed above. Then, when the image of one frame is to be displayed, the first and second image signals are displayed in sequence as first and second images of the original image with such images displaced from each other on the screen.

In one example, assume that the same image information is displayed during 1/60 second in the related art. Now according to the present invention, the image information is separated into a first image information and a second image information, and then the first image information and the second image information are respectively and sequentially displayed at the first and second positions on the screen, each image information for 1/120 seconds.

Figure 7A:
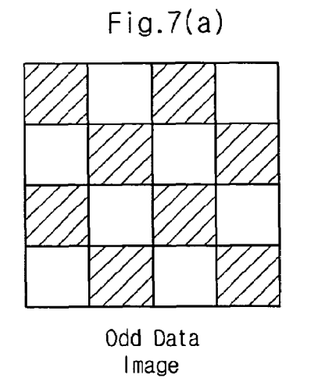
FIGS. 7(a) and 7(b) are respectively examples of views of a first image and a second image displayable using the display device of FIGS. 1 and 2 according to the present invention.
Figure 7B:
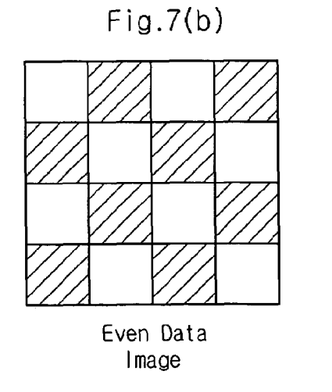

FIGS. 7(a) and 7(b) are respectively exemplary views of a first image and a second image separated from the image corresponding to one frame according to the present invention.

As shown in FIGS. 7(a) and 7(b), the image corresponding to one frame can be separated into the first image (e.g., odd data image) and the second image (e.g., even data image), and the first image and the second image can be separated depending on the positions of the pixels. The positions at which the first image (odd data) and the second image (even data) are displayed differ from each other and such displacement can be achieved by the displacement plate 11 as discussed above.

Returning to FIG. 5(b), in this example, the display positions of the first image (odd data) and the second image (even data) are displaced from each other in a diagonal direction. That is, at time T=0, the first image (odd data image) of the original image is displayed at a first location on the screen for a certain duration. Then at time T=T1, the second image (even data image) of the original image is displayed at a second location on the screen for a certain duration. The second location is displaced from the first location in a diagonal direction.

In the example of FIG. 5(c), the display positions of the first image (odd data) and the second image (even data) are displaced from each other in a horizontal direction. Such displacements can be made by moving the position/angle of the displacement plate or reflection mirror as discussed above.

Figure 6A:
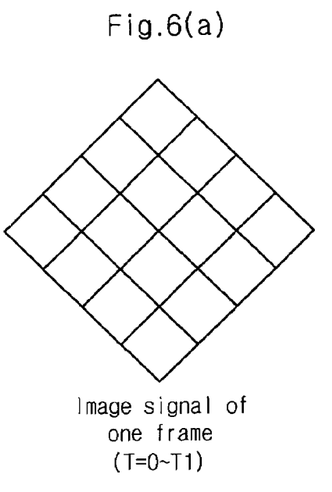
Figure 6B:
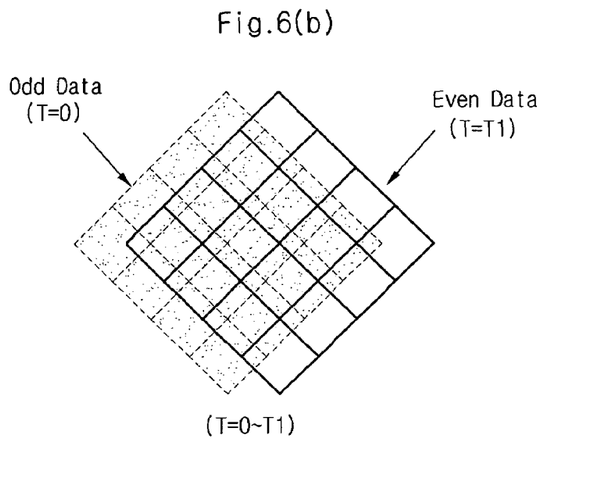

FIGS. 6(a) and 6(b) show the position of an image displayed onto the screen depending on time in a rhombus pixel structure.

Referring to FIG. 6(a), conventionally an image is displayed at the same position on the screen during a predetermined time (T=0–T1). However, referring to FIG. 6(b), according to the present invention, different images are displayed at different positions of the screen at time T=0 and T=T1. Thus, in the present invention, a double resolution can be achieved using the same number of pixels. As a variation, the different images may be displayed at the same time.

Accordingly, the present invention splits an image into two or more sub images (e.g., odd data image and even data image) and displaces them from each other using an optical path changing unit (e.g., displacement plate or reflecting mirror), such that the displaced sub images are displayed sequentially or in some order on the screen. This increases resolution and has the same visual effect of physically increasing the number of pixels on the display device. This effect is shown as an example in FIGS. 3(b) and 3(c).

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device comprising:
   an image forming unit forming an image by using an emitted light and an inputted image signal;
   a projection unit projecting the image formed by the image forming unit onto a screen; and
   a periodically movable displacement plate displacing the image displayed on the screen between a plurality of different positions on the screen;
   wherein an optical path difference (D) between lights generated by the displacement plate is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of the displacement plate;
$\theta_1$ is an incident angle of light;
$\theta_2$ is a refraction angle of light;
T is a thickness of the displacement plate; and
$\chi$ is a length of the optical path within the displacement plate.

2. The display device according to claim 1, wherein the image forming unit uses a transmission-type liquid crystal display.

3. The display device according to claim 1, wherein the image forming unit uses a liquid crystal on silicon (LCoS).

4. The display device according to claim 1, wherein the image forming unit uses a reflection-type liquid crystal display and an X-prism.

5. The display device according to claim 1, wherein the image forming unit uses a color wheel and a digital micromirror device (DMD).

6. The display device according to claim 1, wherein the displacement plate is disposed between the image forming unit and the screen.

7. The display device according to claim 1, wherein the displacement plate is disposed between the image forming unit and the projection unit.

8. The display device according to claim 1, wherein the image displayed on the screen is displaced in a diagonal direction.

9. The display device according to claim 1, wherein the image displayed on the screen is displaced in a horizontal direction.

10. The display device according to claim 1, wherein the image displayed on the screen is displaced in a vertical direction.

11. The display device according to claim 1, wherein a position or an angle of the displacement plate is changeable.

12. The display device according to claim 1, wherein a position and an angle of the displacement plate are changeable.

13. The display device according to claim 1, wherein the displacement plate rotates around a central axis within a predetermined angle range.

14. The display device according to claim 1, wherein the displacement plate periodically moves depending on an image signal.

15. The display device according to claim 1, wherein the image signal is produced by separating an image corresponding to one frame into a plurality of image signals.

16. The display device according to claim 1, wherein the image displayed on the screen has a rectangular pixel structure.

17. The display device according to claim 1, wherein the image displayed on the screen has a rhombus pixel structure.

18. The display device according to claim 1, wherein the displacement plate is a light transmitting element.

19. The display device according to claim 1, wherein the displacement plate changes an optical path by using a light refraction.

20. The display device according to claim 1, wherein a displacement distance of the image displayed on the screen is less than a size of one pixel.

21. A display device comprising:
   an image forming unit forming an image by using an emitted light and an inputted image signal;
   a projection unit projecting the image formed by the image forming unit onto a screen; and
   an optical path changing unit disposed on an optical path through which the image is projected, and periodically changing the optical path to a plurality of different positions on the screen,
   wherein an optical path difference (D) between lights generated by the optical path Charging unit is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of a displacement plate of the optical path charging unit;
$\theta_1$ is an incident angle of light;
$\theta_2$ is a refraction angle of light;
T is a thickness of the optical path changing unit; and
$\chi$ is a length of the optical path within the displacement plate.

22. The display device according to claim 21, wherein the optical path changing unit is a light transmitting element.

23. The display device according to claim 22, wherein the light transmitting element has a refractive index within a range of 1.4 to 2.0.

24. The display device according to claim 21, wherein the optical path changing unit makes an incident light and an output light to have the same traveling direction in different traveling paths.

25. The display device according to claim 21, wherein the optical path changing unit uses a light refraction.

26. The display device according to claim 21, wherein the optical path changing unit periodically changes the optical path depending on the image signal.

27. The display device according to claim 21, wherein the optical path changing unit rotates around a central axis within a predetermined angle range.

28. The display device according to claim 21, wherein the image signal is produced by separating an image corresponding to one frame into a plurality of image signals.

29. The display device according to claim 21, wherein the image displayed on the screen has a rectangular pixel structure.

30. The display device according to claim 21, wherein the image displayed on the screen has a rhombus pixel structure.

31. A display device comprising:
a lamp emitting a light;
a liquid crystal device forming an image by using the light emitted from the lamp and an inputted image signal;
a projection unit enlarging and projecting an image from the liquid crystal device onto a screen; and
an image displacement unit disposed between the liquid crystal device and the projection unit, and periodically displacing the image displayed onto the screen between a plurality of different positions on the screen,
wherein an optical path difference (D) between lights generated by the image displacement unit is given by:

$$D = \frac{T}{\cos\theta_2}\sin(\theta_1 - \theta_2)$$
$$\cos\theta_2 = \frac{T}{x}, \sin(\theta_1 - \theta_2) = \frac{D}{x},$$
$$\theta_2 = \sin^{-1}\left(\frac{n_1 \sin\theta_1}{n_2}\right)$$

where, $n_1$ is a refractive index of air;
$n_2$ is a refractive index of a displacement plate of the image displacement unit;
$\theta_1$ is an incident angle of light;
$\theta_2$ is a refraction angle of light;
T is a thickness of the displacement plate; and
$\chi$ is a length of the optical path within the displacement plate.

32. The display device according to claim 31, wherein the liquid crystal device is a liquid crystal display (LCD) panel.

33. The display device according to claim 31, wherein the liquid crystal device is a liquid crystal on silicon (LCoS).

34. The display device according to claim 31, wherein the image displacement unit is a light transmitting element 35. A display device comprising:
a light source emitting a light;
a rod lens making a uniform distribution of the light emitted from the light source;
a color wheel performing a color separation with respect to the light emitted from the rod lens;
a digital micromirror device (DMD) selectively changing reflection angles of red, green and blue lights emitted from the color wheel depending on an image signal;
a projection unit enlarging and projecting an image from the DMD onto a screen; and
an image displacement unit disposed between the DMD and the projection unit and periodically displacing the image displayed on the screen between a plurality of different positions on the screen,
wherein an optical path difference (D) between lights generated by the image displacement unit is given by:

$$D = \frac{T}{\cos\theta_2}\sin(\theta_1 - \theta_2)$$
$$\cos\theta_2 = \frac{T}{x}, \sin(\theta_1 - \theta_2) = \frac{D}{x},$$
$$\theta_2 = \sin^{-1}\left(\frac{n_1 \sin\theta_1}{n_2}\right)$$

where, $n_1$ is a refractive index of air;
$n_2$ is a refractive index of a displacement plate of the image displacement unit;
$\theta_1$ is an incident angle of light;
$\theta_2$ is a refraction angle of light;
T is a thickness of the displacement plate; and
$\chi$ is a length of the optical path within the displacement plate.

36. The display device according to claim 35, wherein the image displacement unit is a light transmitting element.

37. A display method comprising the steps of:
emitting a light;
forming an image by using a liquid crystal device to which the emitted light and an image signal are inputted;
periodically changing a traveling path of the image via an image displacement unit; and
projecting the image onto a plurality of different positions on a screen,
wherein an optical path difference (D) between lights generated by the image displacement unit is given by:

$$D = \frac{T}{\cos\theta_2}\sin(\theta_1 - \theta_2)$$
$$\cos\theta_2 = \frac{T}{x}, \sin(\theta_1 - \theta_2) = \frac{D}{x},$$
$$\theta_2 = \sin^{-1}\left(\frac{n_1 \sin\theta_1}{n_2}\right)$$

where, $n_1$ is a refractive index of air;
$n_2$ is a refractive index of a displacement plate of the image displacement unit;
$\theta_1$ is an incident angle of light;
$\theta_2$ is a refraction angle of light;
T is a thickness of the displacement plate; and
$\chi$ is a length of the optical path within the displacement plate.

38. A display method comprising the steps of:
emitting a light;
color-separating the emitted light into red, green and blue lights;
reflecting the red, green and blue lights at a digital micromirror device (DMD);

periodically changing a traveling path of the lights reflected from the DMD via an image displacement unit; and projecting the lights with the periodically changed traveling path to a plurality of different positions on a screen, wherein an optical path difference (D) between lights generated by the image displacement unit is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of a displacement plate of the image displacement unit;
$\theta_1$ is an incident angle of light;
$\theta_2$ is a refraction angle of light;
T is a thickness of the displacement plate; and
$\chi$ is a length of the optical path within the displacement plate.

39. A display method comprising the steps of:
emitting a light;
forming an image by using the emitted light and an inputted image signal;
periodically moving a displacement plate disposed on a traveling path of the image; and
projecting the image passing through the displacement plate onto to a plurality of different positions on a screen,
wherein an optical path difference (D) between lights generated by the displacement plate is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of a displacement plate of the image displacement unit;
$\theta_1$ is an incident angle of light;
$\theta_2$ is a refraction angle of light;
T is a thickness of the displacement plate; and
$\chi$ is a length of the optical path within the displacement plate.

40. A display method comprising the steps of:
emitting a light;
forming an image by using the emitted light and an inputted image signal;
periodically refracting the image by using a light transmitting element disposed on a traveling path of the image; and
projecting the image passing through the light transmitting element onto to a plurality of different positions on a screen,
wherein an optical path difference (D) between lights generated by the light transmitting element is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of a displacement plate of the light transmitting element;
$\theta_1$ is an incident angle of light;
$\theta_2$ is a refraction angle of light;
T is a thickness of the displacement plate; and
$\chi$ is a length of the optical path within the displacement plate.

41. A display device comprising:
a light source emitting a light;
a signal processing unit separating one image signal corresponding to one frame into a plurality of image signals;
an image forming unit sequentially forming images by using the plurality of image signals and the emitted light;
a projection unit projecting the images formed by the image forming unit onto a screen; and
a displacement plate disposed between the image forming unit and the screen and configured to periodically move so as to displace positions of the images displayed on the screen between a plurality of different positions on the screen,
wherein an optical path difference (D) between lights generated by the displacement plate light transmitting element is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of a displacement plate;
$\theta_1$ is an incident angle of light;
$\theta_2$ is a refraction angle of light;
T is a thickness of the displacement plate; and
$\chi$ is a length of the optical path within the displacement plate.

42. The display device according to claim 41, wherein the signal processing unit separates one image corresponding to one frame into a plurality of image signals depending on positions of pixels.

43. The display device according to claim 41, wherein the signal processing unit separates one image signal corresponding to one frame into a first image signal and a second image signal;
the image forming unit forms a first image and a second image based on respectively the first image signal and the second image signal; and
the displacement plate displays the first image and the second image respectively at a first position and a second position on the screen in sequence.

44. The display device according to claim 41, wherein the displacement plate is a light transmitting element.

45. The display device according to claim 41, wherein the displacement plate rotates around a central axis within a predetermined angle range.

46. A display device comprising:
a light source emitting a light;
a signal processing unit separating one image signal corresponding to one frame into a plurality of image signals;
an image forming unit sequentially forming images by using the emitted light and the plurality of image signals;
a projection unit projecting the images formed by the image forming unit onto a screen; and
a light transmitting element disposed on an optical path between the image forming unit and the screen and configured to periodically move so as to displace the images displayed on the screen toward a plurality of different positions on the screen by using light refraction,
wherein an optical path difference (D) between lights generated by the light transmitting element is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of a displacement plate of the light transmitting element;
$\theta_1$ is an incident angle of light;
$\theta_2$ is a refraction angle of light;
T is a thickness of the displacement plate; and
$\chi$ is a length of the optical path within the displacement plate.

47. The display device according to claim 46, wherein the light transmitting element rotates around a central axis within a predetermined angle range.

48. The display device according to claim 46, wherein the light transmitting element has a refractive index within a range of 1.4 to 2.0.

49. The display device according to claim 46, wherein the images displayed on the screen are displaced in at least one direction among a diagonal direction, a horizontal direction and a vertical direction.

50. The display device according to claim 46, wherein the light transmitting element moves depending on the inputted image signal.

51. The display device according to claim 46, wherein the signal processing unit separates one image signal corresponding to one frame into a first image signal and a second image signal;
the image forming unit forms a first image and a second image based on the first image signal and the second image signal; and
the light transmitting element displays the first image and second image respectively at a first position and a second position on the screen in sequence.

52. A display method comprising the steps of:
inputting image signals having a plurality of frames;
separating a sequentially inputted image signal of one frame into a plurality of image signals;
sequentially inputting the plurality of separated image signals to form an image; and
alternately projecting the plurality of separated images by periods at a plurality of different positions on a screen via an optical path changing unit,
wherein an optical path difference (D) between lights generated by the optical path changing unit is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of a displacement plate of the optical changing unit;
$\theta_1$ is an incident angle of light;
$\theta_2$ is a refraction angle of light;
T is a thickness of the displacement plate; and
$\chi$ is a length of the optical path within the displacement plate.

53. The display method according to claim 52, wherein the image signal of one frame is separated into a first image signal and a second image signal;
the first image signal and the second image signal are respectively formed as a first image and a second image; and
the first image and the second image are respectively displayed at a first position and a second position on the screen.

54. A display device comprising:
means for separating an image corresponding to an image unit into a plurality of sub-images;
means for displacing the sub-images from each other; and
means for alternately displaying the displaced sub-images by periods at different locations on a screen,
wherein an optical path difference (D) between lights generated by the means for alternately displaying is given by:

$$D = \frac{T}{\cos\theta_2}\sin(\theta_1 - \theta_2)$$

$$\cos\theta_2 = \frac{T}{x}, \sin(\theta_1 - \theta_2) = \frac{D}{x},$$

$$\theta_2 = \sin^{-1}\left(\frac{n_1 \sin\theta_1}{n_2}\right)$$

where, $n_1$ is a refractive index of air;
$n_2$ is a refractive index of a displacement plate of the means for alternately displaying;
$\theta_1$ is an incident angle of light;
$\theta_2$ is a refraction angle of light;
T is a thickness of the displacement plate; and
$\chi$ is a length of the optical path within the displacement plate.

55. The display device according to claim 54, wherein the means for displaying displays the sub-images at different times.

* * * * *